United States Patent
Ostrovsky et al.

(10) Patent No.: US 8,952,973 B2
(45) Date of Patent: Feb. 10, 2015

(54) IMAGE SIGNAL PROCESSOR AND METHOD OF OPERATING THE SAME

(75) Inventors: Evgeny Ostrovsky, Petach Tivka (IL); Guy Gabso, Rumat Gan (IL)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 309 days.

(21) Appl. No.: 13/546,195

(22) Filed: Jul. 11, 2012

(65) Prior Publication Data

US 2014/0015853 A1    Jan. 16, 2014

(51) Int. Cl.
*G06F 12/02* (2006.01)
*G09G 5/39* (2006.01)

(52) U.S. Cl.
USPC .......................................... 345/544; 345/531

(58) Field of Classification Search
CPC ....... G06F 12/02–12/0292; G09G 5/36–5/366; G06T 1/60
USPC ........... 345/544, 545, 530, 531, 543; 382/233
See application file for complete search history.

(56) References Cited

U.S. PATENT DOCUMENTS

| | | | |
|---|---|---|---|
| 7,352,915 B2 | 4/2008 | Nose et al. | |
| 7,408,139 B2 | 8/2008 | Sekimoto et al. | |
| 7,424,172 B2 | 9/2008 | Nose et al. | |
| 8,068,112 B2 * | 11/2011 | Chiu et al. | 345/530 |
| 2002/0124151 A1 * | 9/2002 | Poimboeuf et al. | 712/1 |
| 2009/0180000 A1 | 7/2009 | Shiraishi | |
| 2009/0268078 A1 | 10/2009 | Miyazaki et al. | |
| 2013/0308870 A1 * | 11/2013 | Shan et al. | 382/233 |

FOREIGN PATENT DOCUMENTS

| | | | |
|---|---|---|---|
| JP | 2004234379 A | 8/2004 |
| JP | 2007135135 A | 5/2007 |
| JP | 2009290863 A | 12/2009 |

* cited by examiner

*Primary Examiner* — Jacinta M Crawford
(74) *Attorney, Agent, or Firm* — Harness, Dickey & Pierce, P.L.C.

(57) ABSTRACT

An image signal processor includes a buffer and a buffer controller configured to divide the buffer into a plurality of slots. The buffer controller is configured to store image data necessary for image distortion correction to the buffer. The buffer controller is configured to not store image data unnecessary for image distortion correction to the buffer.

15 Claims, 9 Drawing Sheets

FIG. 7

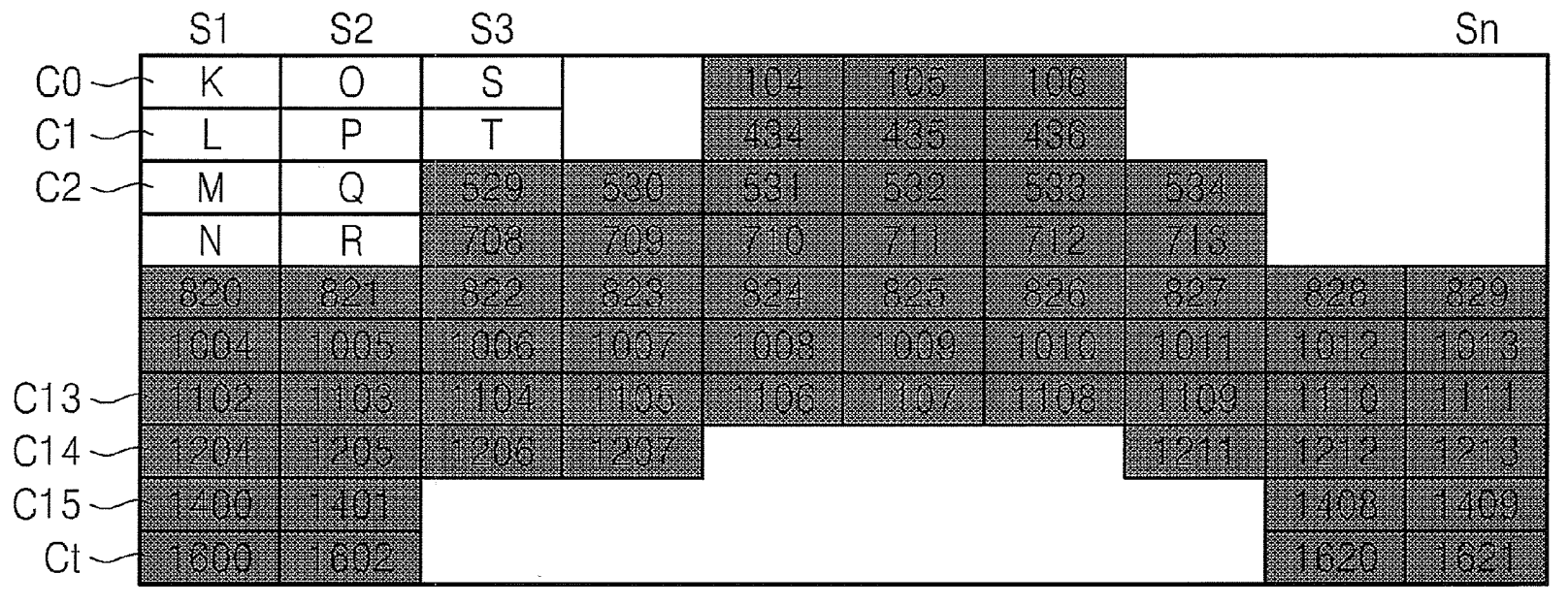

| | S1 | S2 | S3 | | | | | | | | Sn |
|---|---|---|---|---|---|---|---|---|---|---|---|
| C0 | K | O | S | | | | | | | | |
| C1 | L | P | T | | | | | | | | |
| C2 | M | Q | 529 | 530 | | | | | | | |
| | N | R | 703 | 709 | | | | | | | |
| | 830 | 921 | 822 | 828 | 104 | 105 | 106 | | | 828 | 829 |
| | 1004 | 1005 | 1003 | 1007 | 434 | 435 | 436 | | | 1012 | 1013 |
| | 1102 | 1103 | 1104 | 1105 | 531 | 532 | 533 | | | 1110 | 1111 |
| C13 | 1204 | 1205 | 1206 | 1207 | 710 | 711 | 712 | 716 | 827 | 1212 | 1213 |
| C14 | 1400 | 1401 | | | 824 | 825 | 826 | 1010 | 1101 | 1408 | 1409 |
| C15 | 1600 | 1602 | | | 1008 | 1009 | 1010 | 1108 | 1109 | 1620 | 1621 |
| Ct | | | | | 1106 | 1107 | 1108 | | 1211 | | |

IMAGE SIGNAL PROCESSOR AND METHOD OF OPERATING THE SAME

BACKGROUND

At least one example embodiment relates to an image processing system, and more particularly, to an image signal processor for correcting distortion of an image and a method of operating the same.

When a camera uses an inexpensive or a low-performance lens, an image output from the camera may be distorted, which needs to be corrected.

However, to correct the distortion of the image, an image signal processor needs to be able to access a necessary part of the image.

SUMMARY

According to at least one example embodiment, there is provided an image signal processor including a buffer and a buffer controller configured to divide the buffer into a plurality of slots, store image data necessary for image distortion correction to the buffer, and not store image data unnecessary for image distortion correction to the buffer. In at least one example embodiment, each slot in the plurality of slots may include a plurality of chunks, each of the chunks corresponding to a set of pixels from a rectangular region of an image.

In at least one example embodiment, each slot in the plurality of slots may include a first parameter indicating a current chunk offset, a second parameter indicating a current line index of an image, and a third parameter indicating a last free chunk offset.

In at least one example embodiment, each slot in the plurality of slots may further include a fourth parameter indicating a maximum number of chunks in each slot.

In at least one example embodiment, each slot in the plurality of slots may include a different number of chunks.

In at least one example embodiment, the chunks in each of the slots may be the same in size.

In at least one example embodiment, the slots may be updated independently of each other.

In at least one example embodiment, each of the slots may be a circular buffer.

According to at least one example embodiment, a method of operating an image signal processor is provided. The method includes the operations of determining unnecessary image data for image distortion correction and necessary image data for image distortion correction using a transformation function and controlling a buffer to store the necessary image data in a slot of the buffer and not to store the unnecessary image data in the slot of the buffer.

In at least one example embodiment, the slot may include a plurality of chunks, each of the chunks corresponding to set of pixels from a rectangular region of an image.

In at least one example embodiment, the operation of controlling the buffer may include setting a plurality of parameters. The parameters may include a first parameter indicating a current chunk offset, a second parameter indicating a current line index of an image, and a third parameter indicating a last free chunk offset.

In at least one example embodiment, the parameters may further include a fourth parameter indicating a maximum number of chunks in the slot.

In at least one example embodiment, the number of the chunks in the slot may vary.

In at least one example embodiment, the operation of controlling the buffer may include controlling the buffer to store the necessary image data for image distortion correction in the chunks of the slot.

In at least one example embodiment, the method may further include performing interpolation on a pixel included one of the chunks and controlling the buffer to remove an oldest chunk among the chunks.

In at least one example embodiment, the method also further include controlling access to a certain pattern of pixels needed for calculation of interpolated values in the points with given coordinates. The pattern may comprise pixels from several chunks taken from one to two adjacent slots. The method may also support the oldest chunk in slot.

According to at least one example embodiment, an image signal processor may include: a buffer; and a buffer controller configured to receive an image and selectively store a portion of the image to the buffer based on whether the portion of the image is useful for image distortion correction.

In at least one example embodiment, the buffer controller is configured to determine whether a portion of the image is useful for image distortion correction based on a transformation function and an ideal image.

In at least one example embodiment, a portion of image that has been transformed by the transformation function is the portion of the image useful for image distortion correction.

In at least one example embodiment, the image signal processor includes an optical distortion correction unit configured to receive the stored portion of the image, correct distortion of the stored portion of the image, and output a distortion-corrected image to a display.

In at least one example embodiment, the buffer controller may be configured to divide the buffer into a plurality of slots, each slot including a plurality of parameters, and update each slot using the plurality of parameters.

BRIEF DESCRIPTION OF THE DRAWINGS

The above and other features and advantages of example embodiments will become more apparent by describing in detail example embodiments with reference to the attached drawings in which:

FIG. 7 is a diagram for explaining the operation of the image signal processor illustrated in FIG. 2;

DETAILED DESCRIPTION OF EXAMPLE EMBODIMENTS

Figure 1:
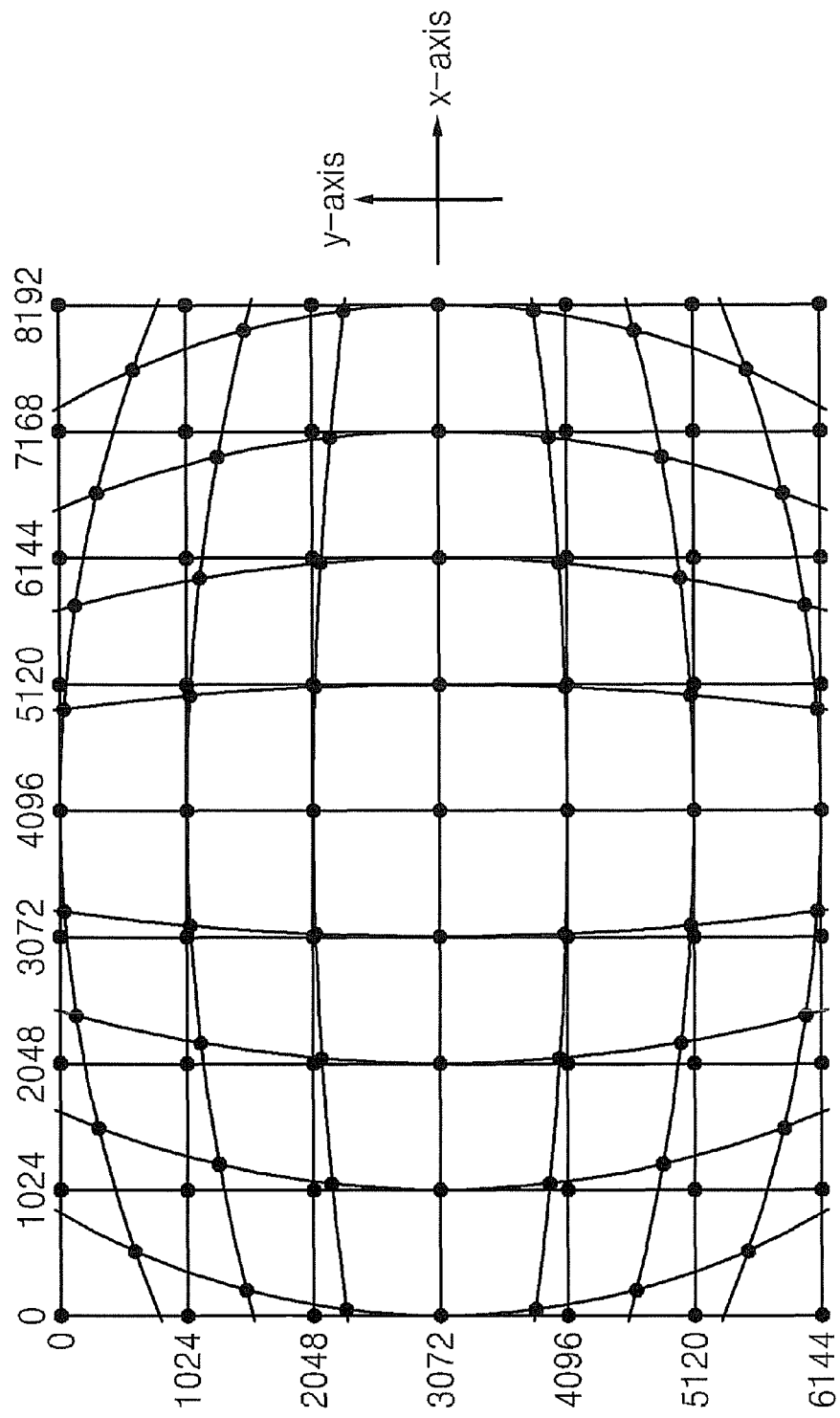
FIG. 1 is a diagram of an example distorted image.

Example embodiments now will be described more fully hereinafter with reference to the accompanying drawings. Example embodiments may, however, be embodied in many different forms and should not be construed as limited to the embodiments set forth herein. Rather, these example embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a diagram of an example of a distorted image.

Referring to FIG. 1, ideal image lines have coordinates x and y, i.e., y=0 and 0≤x≤8192. However, distorted image lines have an arc shape.

Using an inexpensive or low-performance lens may lead the occurrence of the distorted image, which needs to be corrected.

Figure 2:
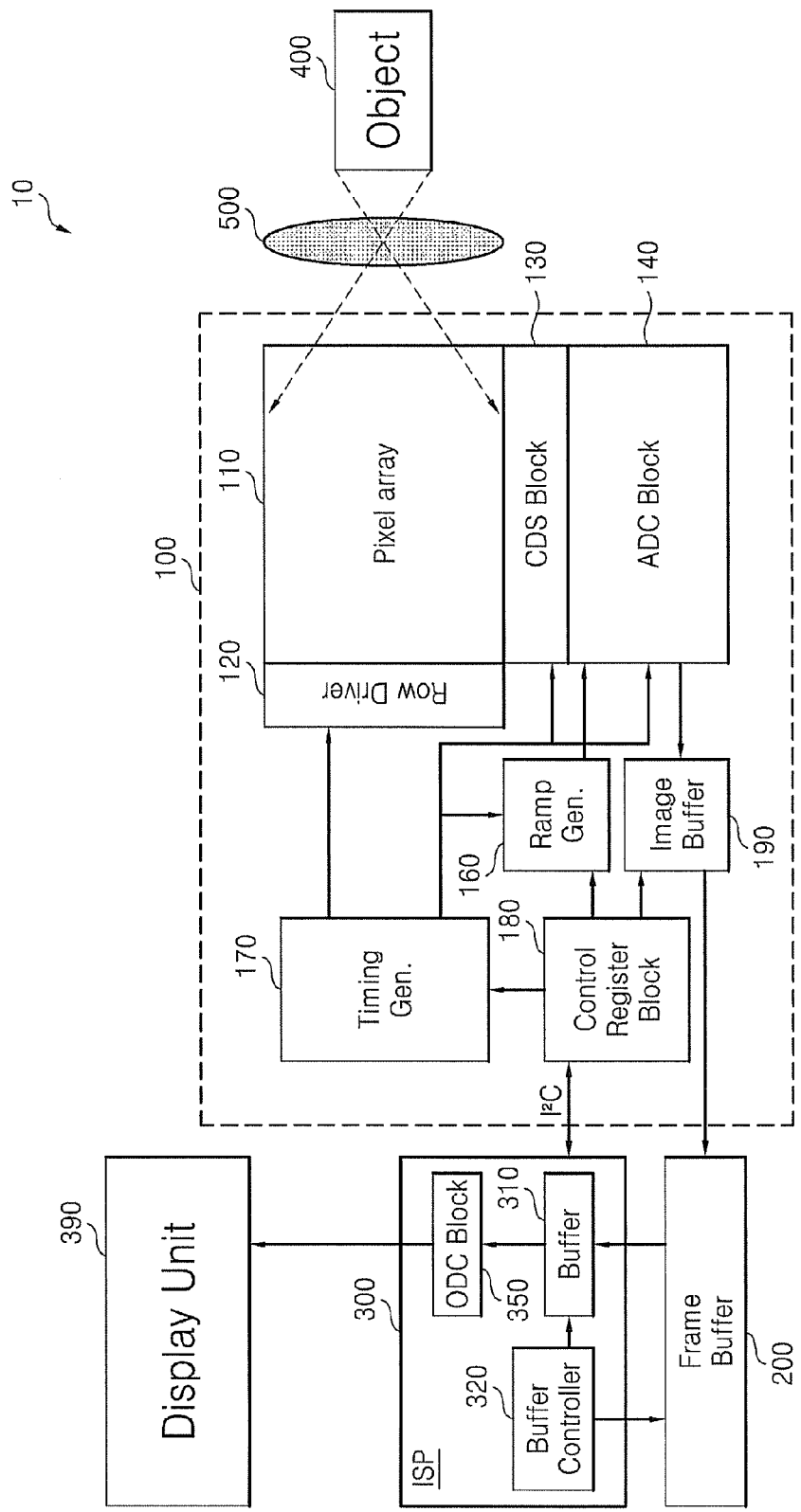
FIG. 2 is a block diagram of an image processing system including an image signal processor according to an example embodiment.

FIG. 2 is a block diagram of an image processing system 10 including an image signal processor (ISP) 300 according to an example embodiment.

Referring to FIG. 2, the image processing system 10 includes an image sensor 100, a frame buffer 200, the ISP 300, and a display unit 390.

The image sensor 100 includes a pixel array 110, a row driver 120, a correlated double sampling (CDS) block 130, an analog-to-digital converter (ADC) block 140, a ramp signal generator 160, a timing generator 170, a control register block 180, and an image buffer 190.

The image sensor 100 is controlled by the ISP 300 to convert an optical image of an object 400 photographed through a lens 500 into electrical image data. In other words, the image sensor 100 converts a sensed optical image into electrical image data and outputs the electrical image data.

If the lens 500 is an inexpensive or a low performance lens, image distortion may occur.

The pixel array 110 includes a plurality of photo sensitive devices such as photo diodes or pinned photo diodes. The pixel array 110 senses light using the photo sensitive devices and converts the light into an electrical signal to generate electrical image data.

The timing generator 170 may output a control signal to the row driver 120, the ADC block 140, and the ramp generator 160 to control the operations of the row driver 120, the ADC block 140, and the ramp generator 160. The control register block 180 may output a control signal to the ramp generator 160, the timing generator 170, and the image buffer 190 to control the operations of the elements 160, 170, and 190.

The row driver 120 drives the pixel array 110 in units of rows. For instance, the row driver 120 may generate a row selection signal. The pixel array 110 outputs to the CDS block 130 a reset signal and an image signal from a row selected by the row selection signal received from the row driver 120. The CDS block 130 may perform CDS on the reset signal and the image signal.

The ADC block 140 compares a ramp signal output from the ramp signal generator 160 with a CDS signal output from the CDS block 130, generates a comparison signal, counts the duration of a particular level, e.g., a high or a low level, of the comparison signal, and outputs a count result to the image buffer 190.

The image buffer 190 stores a digital signal output from the ADC 130. The frame buffer 200 stores distorted image data output from the image buffer 190. If the lens 500 is an inexpensive or low performance lens, the image sensor 100 may output distorted image data.

The ISP 300 corrects distortion of image data output from the frame buffer 200 and outputs distortion-corrected image data to the display unit 390. The display unit 390 may be any device that can display image data output from the ISP 300. For instance, the display unit 390 may be implemented by a thin film transistor liquid crystal display (TFT-LCD), a light emitting diode (LED) display, an organic LED (OLED) display, or an active matrix OLED display. The display unit 390 may be a display terminal of a computer or a portable device.

The ISP 300 includes a buffer 310, a buffer controller 320, and an optical distortion correction (ODC) block 350.

The ISP 300 receives image data from the frame buffer 200 and processes an image corresponding to the image data to provide a distortion-corrected image. The buffer 310 is controlled by the buffer controller 320 to store only the image data necessary to correct image distortion and not store image data that is unnecessary for the correction. In other words, the ISP 300 receives an image and the buffer controller 320 determines which portion of the image is useful for image distortion correction, and then stores that portion of the image to the buffer 310. At the same time, the buffer controller 320 specifically controls a portion of the image not useful for image distortion correction to not be stored in the buffer 310. In this way, the buffer controller 320 selectively stores a portion of the image to the buffer 310 based on whether the portion of the image is useful for image distortion correction. As a result, the buffer 310 does not contain any portion of the image that is not useful for image distortion correction, and more space in the buffer 310 may be available.

Figure 3:
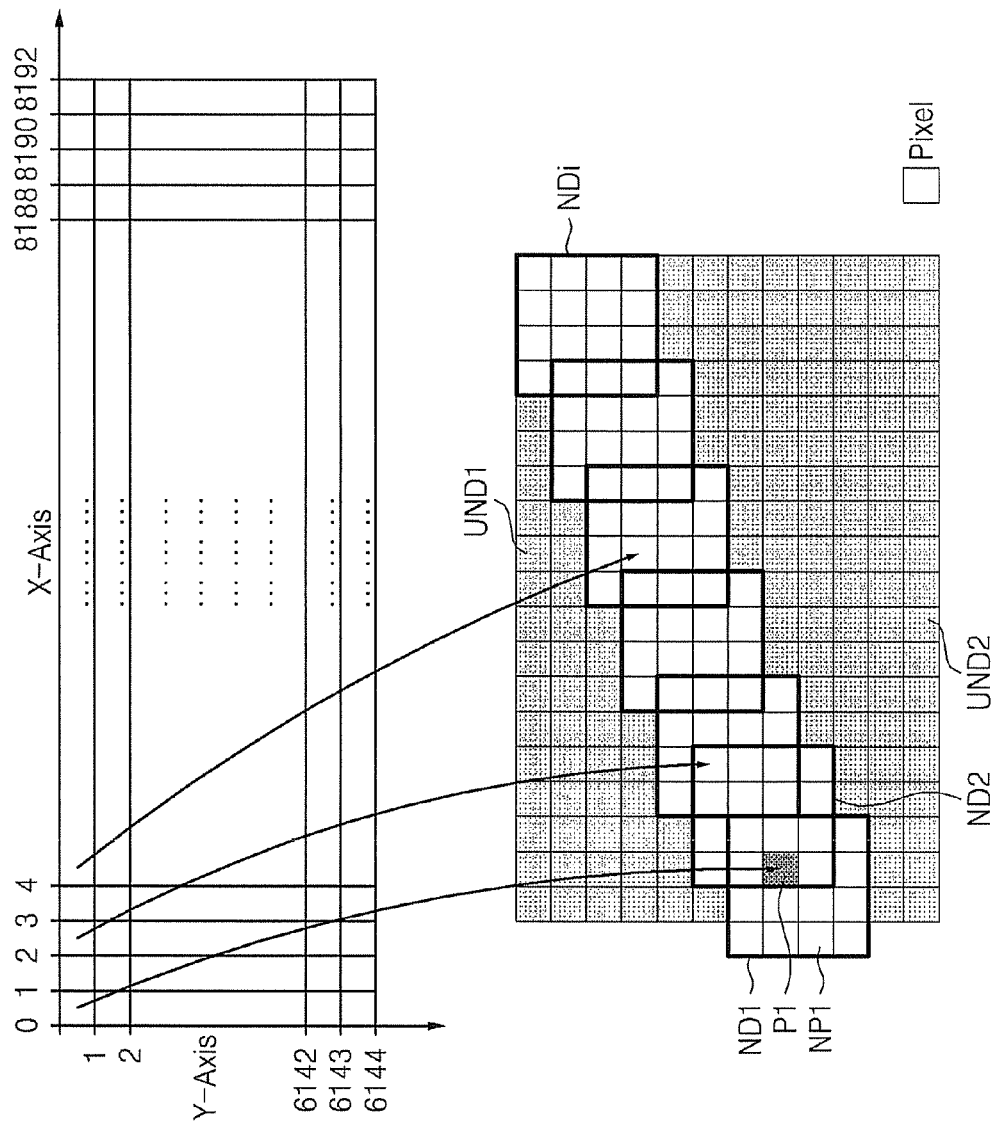
FIG. 3 is a diagram illustrating mapping of an ideal undistorted image to the input distorted one.

FIG. 3 is a diagram illustrating mapping of an ideal, undistorted image to the input of a distorted image. White square patches of the size 4×4 are sample patterns of pixels involved in interpolation procedures. FIG. 3 is a diagram showing image data unnecessary for correction of 1 line of the distorted image and image data necessary for correction of 1 line of the distorted image according to an example embodiment. In FIG. 3, the upper part of FIG. 3 represents an ideal image and the lower part of FIG. 3 represents a distorted image.

Referring to FIGS. 2 and 3, unnecessary data, e.g., UND1 and UND2, for image distortion correction and necessary data, e.g., ND1 through NDi (where "i" is a natural number) are determined using transformation functions expressed by Equations 1 and 2:

$$x'=Tx(x,y) \quad (1)$$

$$y'=Ty(x,y). \quad (2)$$

where "x" and "y" denote coordinates of ideal image data, "x'" and "y'" denote coordinates of distorted image data, and Tx and Ty denote transformation functions.

The transformation functions Tx and Ty may be defined by an analytical or numerical procedure. In order to determine the subset of the distorted image data necessary for restoration, the following procedure is carried out: 1) coordinates of the centers of the current row of ideal image are transformed by the transformation functions Tx and Ty; 2) relevant central pixels P1, P2, ... and Pi along with their neighborhoods ND1, ND2, ..., NDi are defined; and 3) the set of patches ND1 through NDi are identified as the necessary image data for one row of image distortion correction.

Each box indicates a pixel in the diagram illustrated in FIG. 3.

The number of neighbor pixels NP1 may change according to different example embodiments.

Distorted image data that has not been transformed by the transformation functions Tx and Ty are the unnecessary image data UND1 and UND2 for image distortion correction. Distorted image data that has been transformed by the transformation function Tx and Ty are the necessary image data ND1, ND2, ... NDi.

Referring to FIG. 2, the buffer controller 320 controls the buffer 310 to store the necessary image data for image distortion correction therein.

The ODC block 350 corrects distortion of image data using image data output from the buffer 310.

When the coordinates of an ideal pixel are given, the ODC block 350 calculates the coordinates of distorted pixels using the transformation functions.

The ODC block 350 interpolates the distorted pixels using neighboring pixels. Here, the pixel and the neighboring pixels indicate pixel signals output from the pixel array 110 of the image sensor 100.

Neighboring pixels are pixels adjacent to a distorted pixel.

The ISP 300 may also include a camera controller (not shown).

The camera controller controls the control register block 180. The camera controller may control the image sensor 100, and more particularly, the control register block 180 using an inter-integrated circuit ($I^2C$), but example embodiments are not restricted to this example.

The ISP 300 and the frame buffer 200 may be implemented in a single chip.

Figure 4:
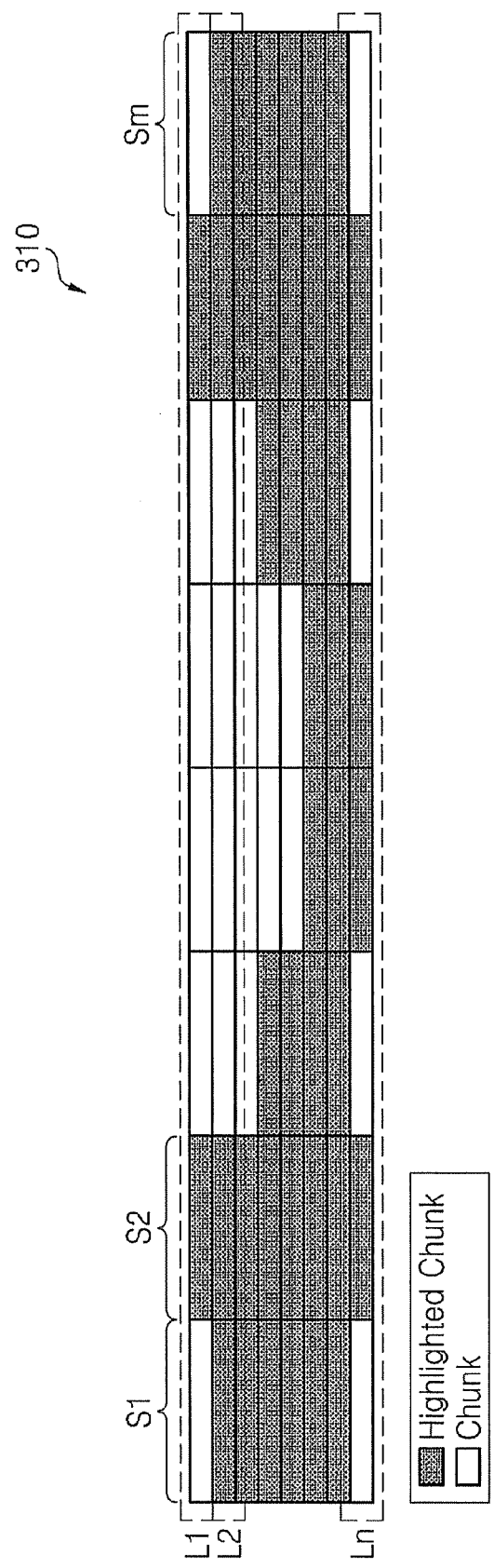
FIG. 4 is a block diagram of a buffer illustrated in FIG. 2.
Figure 5:
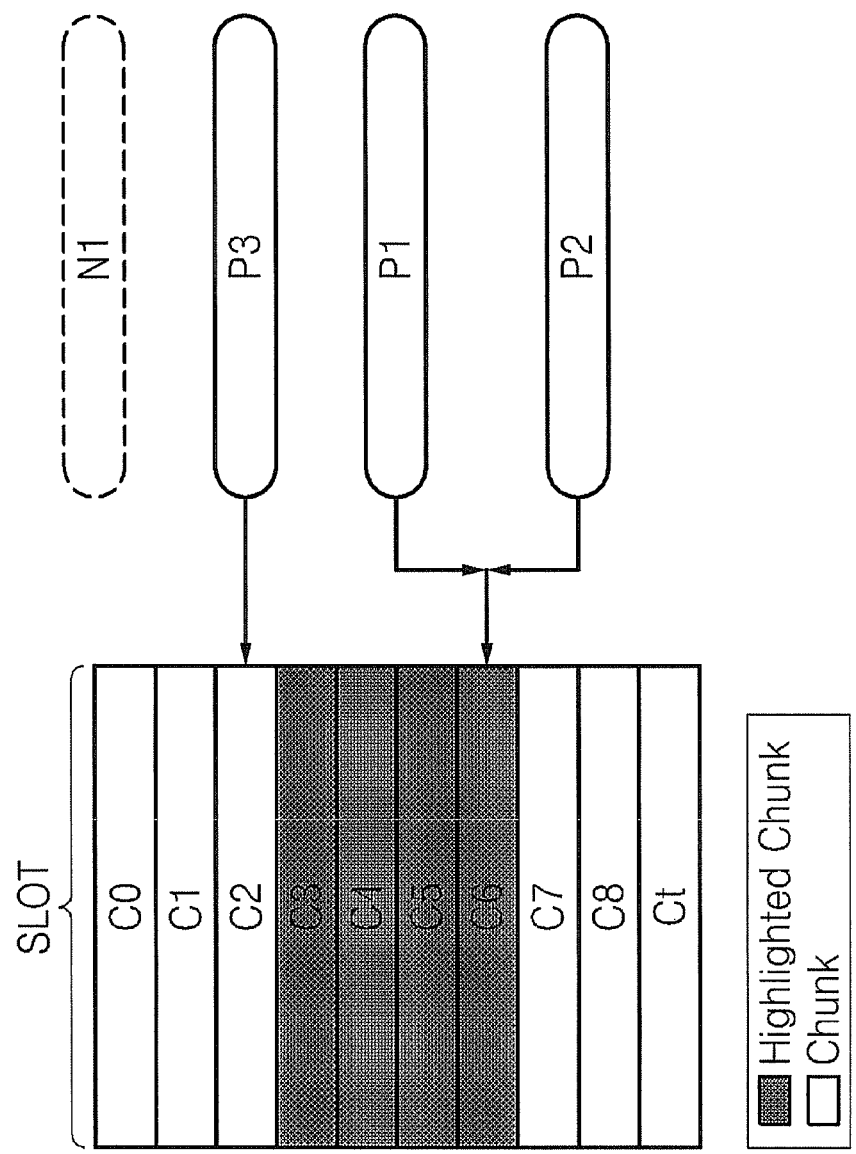
FIG. 5 is a block diagram of one of slots illustrated in FIG. 4.

FIG. 4 is a block diagram of the buffer 310 illustrated in FIG. 2. FIG. 5 is a block diagram of one of slots illustrated in FIG. 4.

Referring to FIGS. 4 and 5, the buffer 310 includes a plurality of line buffers L1, L2, ..., Ln where "n" is a natural number. The line buffers L1 through Ln are space for storing image divided into a plurality of horizontal lines. Under the control of the buffer controller 320, the buffer 310 is divided into a plurality of slots S1, S2, ..., Sm where "m" is a natural number. The buffer 310 is defined as a segmented circular buffer. Under the control of the buffer controller 320, each of the slots Si through Sm is divided into a plurality of chunks C0, C1, ..., Ct where "t" is an integer. Each of chunks C0, C1, ..., Ct is a set of pixels from some rectangular region of image. The size and format of each of the chunks may vary according to example embodiments.

Each of the slots S1 through Sm is a group of the chunks C0 through Ct. The chunks C0 through Ct are space for storing image data. The chunks C0 through Ct may be the same in size.

In other embodiments, the slots S1 through Sm may include different numbers of chunks. For instance, the number of chunks in the first slot Si may be different from the number of chunks in the second slot S2.

Each of the slots S1 through Sm may be implemented by a circular buffer.

Each block indicates a chunk in the diagram illustrated in FIG. 4.

Under the control of the buffer controller 320, the slots S1 through Sm of the buffer 310 store necessary image data for image distortion correction but do not store unnecessary image data for image distortion correction.

In FIGS. 4 and 5, highlighted chunks indicate that they include necessary image data for image distortion correction.

Each of the slots S1 through Sm includes a plurality of image parameters (hereinafter, referred to as "parameter(s)").

For instance, each of the slots S1 through Sm includes a first parameter P1 indicating a current chunk offset corresponding to a displacement of a current chunk (e.g., C6) from the first chunk C0, a second parameter P2 indicating a current line index of an image, a third parameter P3 indicating a last free chunk offset corresponding to displacement of a highlighted chunk (e.g., C3) from the first chunk C0, and a fourth parameter N1 (optionally) indicating the maximum number of chunks in the slot.

For instance, when the current chunk is the seventh chunk C6 and a current line number is 78, the first parameter P1 indicates the seventh chunk C6 and the second parameter P2 indicates 78.

When free chunks are the chunks C0 through C2 and the chunk C3 includes image data, the third parameter P3 indicates the third chunk C2.

When each of the slots S1 through Sm is completely filled with an image, a difference between the first parameter P1 and the third parameter P3 indicates the maximum number of chunks having image data to be used for image distortion correction. The first parameter P1 and the second parameter P2 are needed to update and correct image data.

Figure 6:
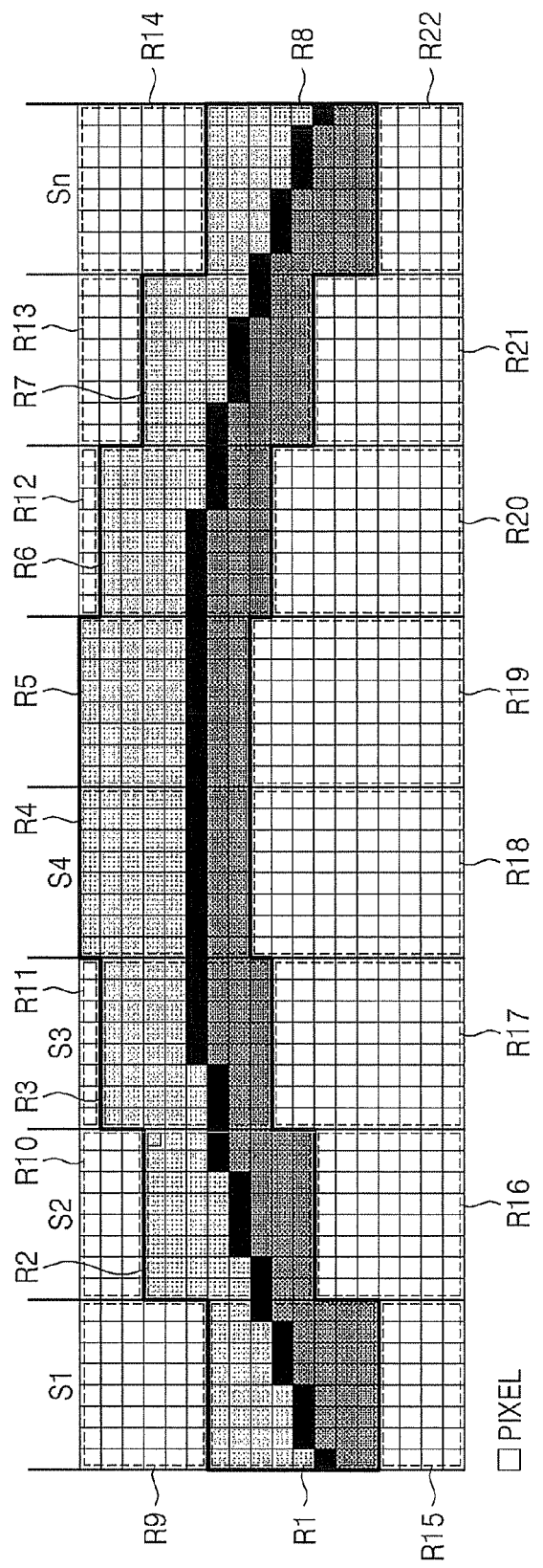
FIG. 6 is a diagram of a part of the image of FIG. 1 mapped to the buffer illustrated in FIG. 4.

FIG. 6 is a diagram of a part of the image of FIG. 1 mapped to the buffer 310 illustrated in FIG. 4.

Referring to FIGS. 2 and 6, the slots S1 through Sm do not store image data R9 through R22 unnecessary for image distortion correction but do store image data R1 through R8 necessary for image distortion correction. Accordingly, space of the buffer 310 may be saved/conserved.

The image data R9 through R22 unnecessary for image distortion correction and the image data R1 through R8 necessary for image distortion correction are decided by the transformation functions Tx and Ty shown in Equations 1 and 2.

The image data R9 through R22 unnecessary for image distortion correction and the image data R1 through R8 necessary for image distortion correction include a plurality of pixels.

Each of the pixels indicates a pixel signal output from the pixel array 110 of the image sensor 100. Each box in FIG. 6 indicates a pixel.

FIG. 7 is a diagram for explaining the operation of the ISP 300 illustrated in FIG. 2. In FIG. 7, a number or an alphabetic character in each box indicates the position of captured pixels included in a chunk. For instance, in pixel 1204, "12" indicates the position of the captured pixel on the y-axis and "04" indicates the position of the captured pixel on the x-axis. Pixel 1204 is used for interpolation. Characters "K", "L", "M" and "N" also indicate the position of a pixel, but the pixels K, L, M and N are not used for the interpolation. Here, each pixel indicates a pixel signal output from the pixel array 110 of the image sensor 100.

Referring to FIGS. 2 and 7, the buffer 310 fills the chunks C0 through Ct of the first slot S1 with image data composed of pixels K, L, M, N, 820, 1004, 1102, 1204, 1400 and 1600, respectively. This operation is referred to as pre-filling. For instance, the pixel K is filled in the chunk C0 and the pixel 1204 is filled in the chunk C13. The width of chunk may be greater than 1 pixel and may be 8, 16 or more pixels depending on the architecture. The height of a chunk may also vary from 1, 2, or more lines and depends on the architecture as well.

The ODC block 350 performs interpolation on the pixel 1204 using the pixels 820, 1004, and 1102.

After the interpolation, the buffer 310 removes the oldest chunk (e.g., C0) in a remove operation and fills a chunk (e.g., Ct) of the first slot S1 with new image data composed of a plurality of pixels in a store operation.

The slots S1 through Sm of the buffer 310 may be updated independently from one another. In other words, the remove operation and the store operation may be performed in the slots S1 through Sm independently. Accordingly, the parameters of a slot may be changed as new image data is stored to the slot.

In a similar manner, the ODC block 350 performs interpolation on the next pixel, e.g., the pixel 1102.

At this time, the buffer 310 fills image data composed of pixels O, P, Q, R, 821, 1005, 1103, 1205, 1401, and 1602 in the chunks C0 through Ct of the slot S2. In another example embodiment, the buffer 310 may fill image data composed of pixels 821, 1005, 1103, and 1205 in a plurality of chunks in the slot S2.

Figure 8:
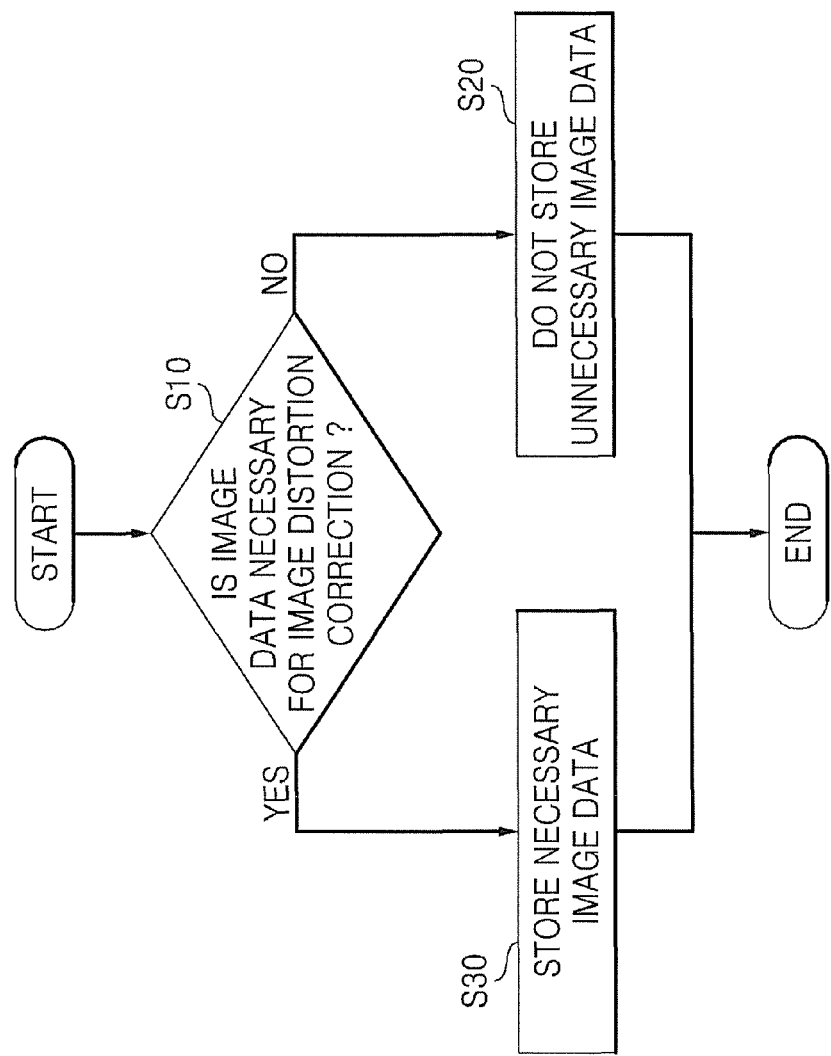
FIG. 8 is a flowchart of a method of operating an image signal processor according to an example embodiment.

FIG. 8 is a flowchart of a method of operating the ISP 300 according to an example embodiment.

Referring to FIGS. 2, 6, and 8, the ISP 300 decides the unnecessary image data R9 through R22 for image distortion correction and the necessary image data R1 through R8 for image distortion correction using the transformation functions Tx and Ty in operation S10.

When image data is transformed, the central pixels calculated by the transformation functions Tx and Ty along with respective neighborhood pixels (e.g. 4×4 pixels patches) make up the necessary image data R1 through R8 for image distortion correction. The rest of image data R9 through R22 is not needed for image distortion correction.

The buffer controller 320 controls the buffer 310 not to store the image data R9 or R15 unnecessary for image distortion correction in the first slot S1 in operation S20 and controls the buffer 310 to store the image data R1 necessary for image distortion correction in the first slot S1 in operation S30.

Figure 9:
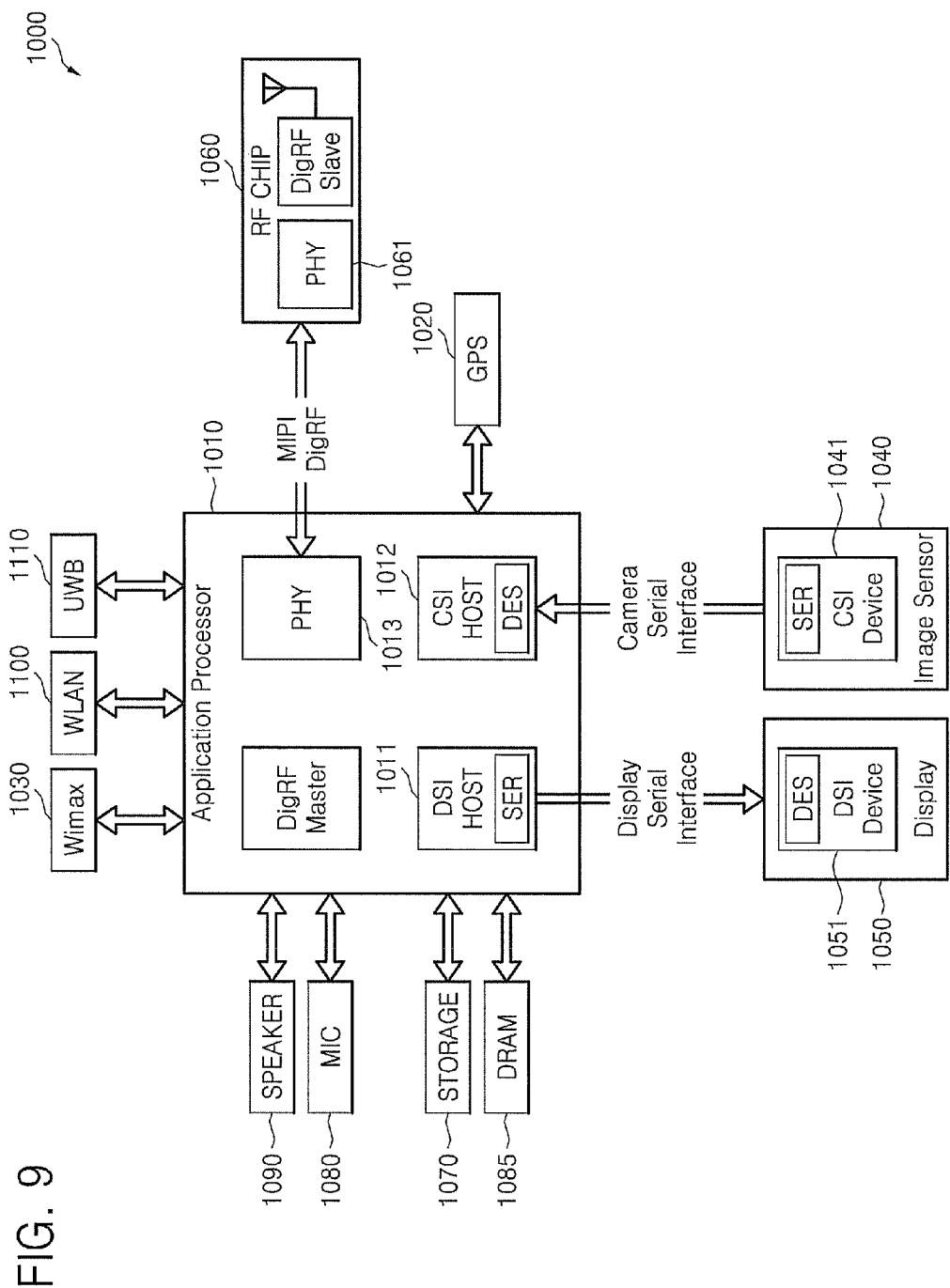
FIG. 9 is a schematic block diagram of an image processing system according to another example embodiment.

FIG. 9 is a schematic block diagram of an image processing system 1000 according to another example embodiment. Referring to FIG. 9, the image processing system 1000 may be implemented as a data processing device, such as a mobile phone, a personal digital assistant (PDA), a portable media player (PMP), a smart phone, a tablet computer, etc.

The image processing system 1000 includes an application processor 1010, an image sensor 1040, and a display 1050.

A camera serial interface (CSI) host 1012 implemented in the application processor 1010 may perform serial communication with a CSI device 1041 included in the image sensor 1040 through CSI.

A display serial interface (DSI) host 1011 implemented in the application processor 1010 may perform serial communication with a DSI device 1051 included in the display 1050 through DSI.

The image processing system 1000 may also include a radio frequency (RF) chip 1060 communicating with the application processor 1010. A physical layer (PHY) 1013 of the application processor 1010 and a PHY 1061 of the RF chip 1060 may communicate data to each other according to mobile industry processor interface (MIPI) DigRF.

The image processing system 1000 may further include a global positioning system (GPS) 1020, a storage 1070, a microphone (MIC) 1080, a dynamic random access memory (DRAM) 1085, and a speaker 1090. The image processing system 1000 may communicate using a Worldwide interoperability for microwave access (Wimax) 1030, a wireless local area network (WLAN) 1100, and/or an ultra-wideband (UWB) 1110.

According to an example embodiment, an ISP and a method of operating the same may save space of a buffer used for image distortion correction.

While example embodiments have been particularly shown and described, it will be understood by those of ordinary skill in the art that various changes in forms and details may be made therein without departing from the spirit and scope of the following claims.

What is claimed is:

1. An image signal processor comprising:
   a buffer; and
   a buffer controller configured to divide the buffer into a plurality of slots, store image data necessary for image distortion correction to the buffer, and not store image data unnecessary for image distortion correction to the buffer,
   wherein each slot in the plurality of slots includes a plurality of chunks, each of the chunks corresponding to a set of pixels from a rectangular region of an image, and
   each slot in the plurality of slots includes:
      a first parameter indicating a current chunk offset;
      a second parameter indicating a current line index of an image; and
      a third parameter indicating a last free chunk offset.

2. The image signal processor of claim 1, wherein each of the slots further includes a fourth parameter indicating a maximum number of chunks in each slot.

3. The image signal processor of claim 1, wherein each of the slots includes a different number of chunks.

4. The image signal processor of claim 1, wherein the chunks are the same in size.

5. The image signal processor of claim 1, wherein the slots are updated independently from one another.

6. The image signal processor of claim 1, wherein each of the slots is a circular buffer.

7. A method of operating an image signal processor, the method comprising:
   determining image data unnecessary for image distortion correction and image data necessary for image distortion correction using a transformation function; and controlling a buffer to store the necessary image data in a slot of the buffer and not store the unnecessary image data in the slot of the buffer, wherein the slot includes a plurality of chunks, each of the chunks corresponding to a set of pixels from a rectangular region of an image, and the controlling the buffer includes setting a plurality of parameters, and the parameters include:
- a first parameter indicating a current chunk offset;
- a second parameter indicating a current line index of an image; and
- a third parameter indicating a last free chunk offset.

8. The method of claim 7, wherein the parameters further include a fourth parameter indicating a maximum number of chunks in the slot.

9. The method of claim 7, wherein the number of the chunks in the slot varies.

10. The method of claim 7, wherein the controlling the buffer includes controlling the buffer to store the necessary image data for image distortion correction in the chunks of the slot.

11. The method of claim 10, further comprising:
- performing interpolation on a pixel included in one of the chunks; and
- controlling the buffer to remove an oldest chunk among the chunks.

12. An image signal processor comprising:
- a buffer; and
- a buffer controller configured to,
  - divide the buffer into a plurality of slots,
  - receive an image, and
  - selectively store a portion of the image to the buffer based on whether the portion of the image is useful for image distortion correction,
  - wherein each slot in the plurality of slots includes a plurality of chunks, each of the chunks corresponding to a set of pixels from a rectangular region of an image, and each slot in the plurality of slots includes:
    - a first parameter indicating a current chunk offset;
    - a second parameter indicating a current line index of an image; and
    - a third parameter indicating a last free chunk offset.

13. The image signal processor of claim 12, wherein the buffer controller is configured to determine whether a portion of the image is useful for image distortion correction based on a transformation function and an ideal image.

14. The image signal processor of claim 13, wherein a portion of image that has been transformed by the transformation function is the portion of the image useful for image distortion correction.

15. The image signal processor of claim 12, further comprising:
- an optical distortion correction unit configured to receive the stored portion of the image, correct distortion of the stored portion of the image, and output a distortion-corrected image to a display.

* * * * *